US008409544B2

(12) United States Patent
Peng et al.

(10) Patent No.: US 8,409,544 B2
(45) Date of Patent: Apr. 2, 2013

(54) PREPARATION METHOD OF FERROFERRIC OXIDE MAGNETIC NANOSPHERES

(75) Inventors: Mingli Peng, Shaanxi (CN); Caiquan Zhang, Shaanxi (CN); Yali Cui, Shaanxi (CN); Chao Chen, Shaanxi (CN); Jinghui Zeng, Shaanxi (CN)

(73) Assignee: Xi'an Goldmag Nanobiotech Co. Ltd., Shaanxi (CN)

(*) Notice: Subject to any disclaimer, the term of this patent is extended or adjusted under 35 U.S.C. 154(b) by 0 days.

(21) Appl. No.: 13/142,167

(22) PCT Filed: Dec. 31, 2008

(86) PCT No.: PCT/CN2008/002148
§ 371 (c)(1),
(2), (4) Date: Sep. 16, 2011

(87) PCT Pub. No.: WO2010/075639
PCT Pub. Date: Jul. 8, 2010

(65) Prior Publication Data
US 2011/0318261 A1    Dec. 29, 2011

(30) Foreign Application Priority Data
Dec. 31, 2008   (CN) .......................... 2008 1 0236541

(51) Int. Cl.
*C01G 49/02*  (2006.01)
(52) U.S. Cl. .......................... 423/633; 423/632; 977/773
(58) Field of Classification Search .......... 423/632–633; 977/773
See application file for complete search history.

(56) References Cited

U.S. PATENT DOCUMENTS
2012/0003321 A1   1/2012   Peng et al.
2012/0121717 A1   5/2012   Chao et al.

FOREIGN PATENT DOCUMENTS
CN          1645530 A         7/2005
(Continued)

OTHER PUBLICATIONS
Deng et al. "Monodisperse Magnetic Single-Crystal Ferrite Microspheres". Angew. Chem. Int. Ed. 2005, 44, 2782-2785.*
(Continued)

*Primary Examiner* — Daniel C McCracken
*Assistant Examiner* — Richard M Rump
(74) *Attorney, Agent, or Firm* — Lathrop & Gage LLP

(57) ABSTRACT

Disclosed is a process of preparing magnetite nanoparticles, comprising the following steps: 1) preparing a ferric salt mixed system, wherein a soluble ferric salt is dissolved in glycol at ambient temperature, and then urea and polyethylene glycol are added and mixed homogeneously to obtain the trivalent iron salt mixed system, the mass ratio of glycol to the trivalent iron salt being 15:1 to 60:1, glycol to urea being 20:1 to 100:1, and glycol to polyethylene glycol being 20:1 to 100:1; 2) reacting, wherein the trivalent iron salt mixed system is transferred into a reaction autoclave, sealed and placed into a heating device to react at a temperature of 200 to 300° C. for 8 to 72 hours; and 3) washing, wherein after the reaction system is naturally cooled down to ambient temperature, the product is taken out, and washed with anhydrous ethanol and water in turn to obtain the magnetite nanoparticles. The soluble iron salt includes ferric chloride, ferric sulfate, ferric acetate and ferric nitrate. The obtained nanospheres exhibit a uniform distribution of the particle diameter with a good dispersity in water. The nanospheres have superparamagnetism, and their particle diameter can be controlled by varying the reaction time as desired.

4 Claims, 2 Drawing Sheets

FOREIGN PATENT DOCUMENTS

| | | |
|---|---|---|
| CN | 1986427 A | 6/2007 |
| CN | 101323466 A | 12/2008 |
| JP | 2008-110889 A | 5/2008 |
| WO | WO 2010/072018 | 7/2010 |
| WO | WO 2010/078675 | 7/2010 |

OTHER PUBLICATIONS

Chen et al. "Hollow magnetite spheres: Synthesis, characterization, and magnetic properties" Chemical Physics Letters vol. 422, Issues 1-3, Apr. 28, 2006, pp. 294-298.*

Sun, J. et al. "Synthesis and characterization of biocompatible Fe3O4 nanoparticles". Journal of Biomedical Materials Research Part A vol. 80A, Issue 2, pp. 333-341, Feb. 2007.*

Zhong et al. "Self-Assembled 3D Flowerlike Iron Oxide Nanostructures and Their Application in Water Treatment". Adv. Mater. 18 (2006). 2426-2431.*

International Preliminary Report on Patentability, Corresponding to International Application No. PCT/CN2008/02148, Issued Jul. 5, 2011.

* cited by examiner

PREPARATION METHOD OF FERROFERRIC OXIDE MAGNETIC NANOSPHERES

CROSS-REFERENCE TO RELATED APPLICATIONS

This application is the U.S. national stage application under 35 U.S.C. §371 of International Application No. PCT/CN2008/002148, filed Dec. 31, 2008, which claims the benefit of Chinese Patent Application CN200810236541.9 filed Dec. 31, 2008, each of which is hereby incorporated by reference to the extent not inconsistent with the disclosure presented herein.

FIELD OF THE INVENTION

The present invention relates to a process of preparing and synthesis of inorganic materials, particularly relates to a process of preparing magnetite nanospheres.

BACKGROUND OF THE INVENTION

Magnetic nano-materials, as a kind of soft magnetic materials, have been widely applied in the fields of magnetic medium memory, magnetic resonance imaging, catalysts and so on. Magnetite is of great interest due to its good magnetic property, biocompatibility and low toxicity. Currently, the research on magnetite has been extended to the field of biological medicines, especially the targeted drug delivery, in which by an applied magnetic field, a targeted magnetic drug carrier containing nano-sized magnetite may enrich itself in lesion sites of an organism, thereby resulting in reduced exposure of normal tissues to the drug and decreased toxic and side effects, thus efficiently reducing the amount of the drug and improving the efficacy.

Currently, the preparation methods of magnetite mainly includes chemical co-precipitation, micro-emulsion, thermal decomposition, solvent thermal synthesis and the like. The co-precipitation method is the most commonly used in the magnetic particle synthesis. This method is easy to operate; however, the resulting particles have poor dispersity and tend to produce heterogeneous phase, thereby generating impure products and with a wide particle distribution. The micro-emulsion method results in magnetic nanoparticles with a well-controlled particle diameter; however, they often have good dispersity in an oil phase while tend to agglomerate in an aqueous phase, which limits its application in biology. As a result, there is still a challenge in synthesis of magnetite nanospheres with good dispersity, uniform particle diameter and controlled dimension in an aqueous phase.

SUMMARY OF THE INVENTION

Object of the Invention

In order to solve the technical problems mentioned above in the background of the invention, the present invention provides a process of preparing magnetite nanoparticles by solvent thermal synthesis, wherein the process is carried out in one shot at a high temperature and a high pressure without a post-crystallization treatment. The resulting powders are pure and have a narrow distribution of particle diameter. The magnetite nanoparticles thus obtained have excellent monodispersity, superparamagnetism and particle diameter uniformity in water.

Technical Solution of the Invention

The present invention provides a process of preparing magnetite nanoparticles, characterized in its including of the following steps:

1) preparing a ferric salt mixed system, wherein a soluble ferric salt is dissolved in glycol at ambient temperature, and then urea and polyethylene glycol are added and mixed homogeneously to obtain the ferric salt mixed system, wherein the mass ratio of glycol to the ferric salt is 15:1 to 60:1, glycol to urea is 20:1 to 100:1, and glycol to polyethylene glycol is 20:1 to 100:1;

2) reacting, wherein the ferric salt mixed system is transferred into a reaction autoclave, sealed and placed into a heating device to react at a temperature of 200 to 300° C. for 8 to 72 hours 3) washing, wherein after the reaction system is naturally cooled down to ambient temperature, the product is taken out of the reactor, and washed with anhydrous ethanol and water in turn to obtain the magnetite nanospheres.

The abovementioned soluble ferric salt includes ferric chloride, ferric sulfate, ferric acetate and ferric nitrate.

The abovementioned polyethylene glycol has a molecular weight between 400 and 20,000.

Advantages of the Invention

1. Urea according to the present invention is used as a precipitant, which decomposes stepwise during the heating reaction so as to provide a base gradually for precipitating the magnetic nanospheres formed. The magnetite nanoparticles obtained according to the invention have uniform particle diameter.

2. The polyethylene glycol according to the invention is added as a protective agent, which on the one hand controls the morphology of the formed microspheres, and on the other hand, modifies the surface properties of the microspheres to make the obtained microspheres good dispersion in water.

3. The magnetic nanospheres obtained according to the invention have good magnetic response and superparamagnetism.

4. The magnetite nanoparticles obtained according to the invention may have varying particle diameters as desired by varying the reaction time.

5. The present invention involves easily obtained raw materials, simple preparation process and no complicated or expensive machines, thus it is easy to realize industrialization production.

DETAILED DESCRIPTION OF THE INVENTION

The process of preparing magnetite nanoparticles including the following steps:
1) Preparing a ferric salt mixed system,
   wherein a soluble ferric salt is dissolved in glycol at ambient temperature, and then urea and polyethylene glycol are added and mixed uniformly to obtain the ferric salt mixed system, wherein
   the mass ratio of glycol to the trivalent iron salt is 15:1 to 60:1, glycol to urea is 20:1 to 100:1, and glycol to polyethylene glycol is 20:1 to 100:1;
2) Reacting,
   wherein the ferric salt mixed system is transferred into a reaction autoclave, sealed and placed into a heating device to react at a temperature of 200 to 300° C. for 8 to 72 hours; and
3) Washing,
   wherein after the reaction system is naturally cooled down to ambient temperature, the product is taken out, and washed with anhydrous ethanol and water in turn to obtain the magnetite nanoparticles.

The abovementioned soluble ferric salt includes ferric chloride, ferric sulfate, ferric acetate and ferric nitrate.

The abovementioned polyethylene glycol has a molecular weight between 400 and 20,000.

Urea decomposes stepwise during the heating reaction to form ammonia, thus providing a base gradually for precipitating the formed magnetic nanospheres. The magnetite nanoparticles thus obtained have a uniform particle diameter.

The polyethylene glycol is used as a protective agent, which on the one hand controls the morphology of the formed microspheres, and on the other hand, modifies the surface properties of microspheres to make the obtained microspheres good dispersion in water.

The magnetic nanospheres obtained according to the invention have good magnetic response and superparamagnetism. The particle diameter of the microparticles can vary as desired by varying the reaction time.

The invention is illustrated in more detail by referring to the following examples.

EXAMPLE 1

Figure 1:
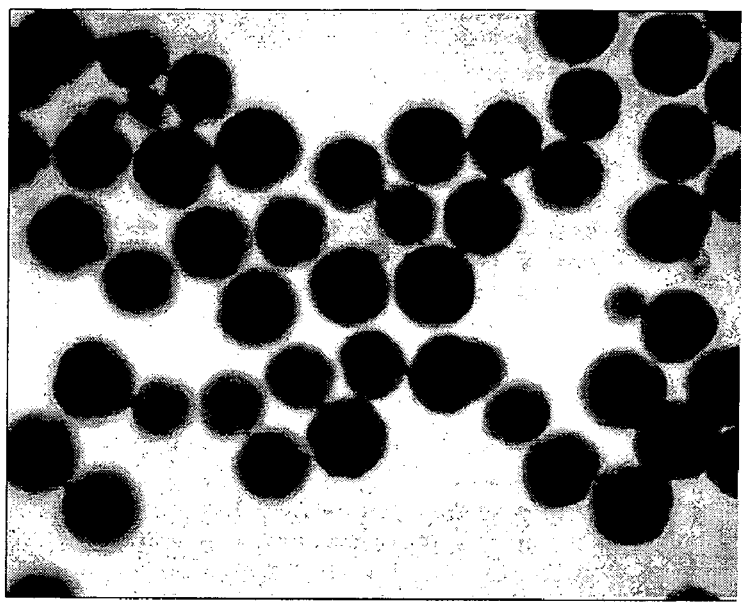
FIG. 1 is a transmission electron microscope image of magnetite nanoparticles.
Figure 2:
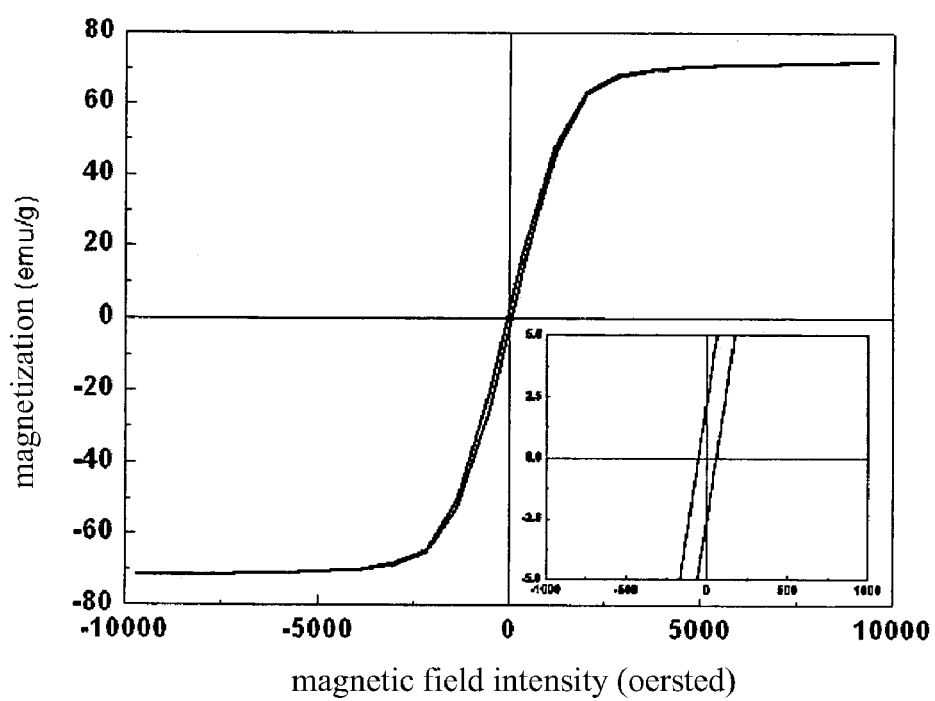
FIG. 2 is a magnetic hysteresis loop graph of magnetite nanoparticles.

1.35 g of hydrated ferric chloride was dissolved in 40 ml of glycol at ambient temperature, and then 1 g of urea and 1 g of polyethylene glycol were dissolved in the abovementioned solution and mixed uniformly. The mixed solution was entirely transferred into a reaction autoclave with a capacity of 50 ml, sealed, and then placed into a heating device at 200° C. for 8 hours. After the reaction system was naturally cooled down to ambient temperature, the product was taken out and separated, and then washed with anhydrous ethanol and water three times respectively. The resulting product was then redispersed into water. The analysis showed that the product was magnetite in morphology of sphericity, with a uniform particle diameter of 260 nm in average and a saturation magnetization of 71.5 emu/g. The TEM photograph thereof was shown in FIG. 1, and the magnetic hysteresis loop was shown in FIG. 2.

EXAMPLE 2

Figure 3:
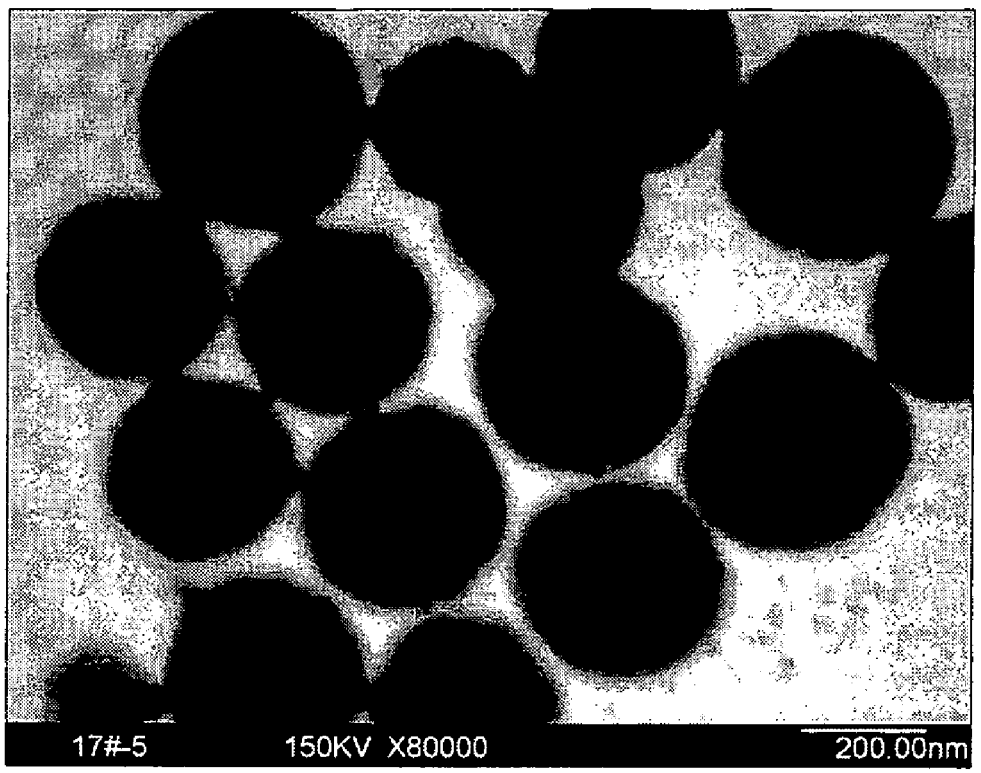
FIG. 3 is a transmission electron microscope image of magnetite nanoparticles.

1.35 g of hydrated ferric chloride was dissolved in 40 ml of glycol at ambient temperature, and then 1 g of urea and 1 g of polyethylene glycol were dissolved in the abovementioned solution and mixed uniformly. The mixed solution was entirely transferred into a reaction autoclave with a capacity of 50 ml, sealed and then placed into a heating device at 200° C. for 12 hours. After the reaction system was naturally cooled down to ambient temperature, the product was taken out and separated, and then washed with anhydrous ethanol and water three times respectively. The resulting product was then redispersed into water. The analysis showed that the product was magnetite in morphology of sphericity, with a uniform particle diameter of 330 to 360 nm and a saturation magnetization of greater than 60 emu/g. The TEM photograph thereof was shown in FIG. 3.

EXAMPLE 3

1.35 g of hydrated ferric chloride was dissolved in 40 ml of glycol at ambient temperature, and then 0.5 g of urea and 1 g of polyethylene glycol were dissolved in the abovementioned solution and mixed uniformly. The mixed solution was transferred into a reaction autoclave with a capacity of 50 ml, sealed and then placed into a heating device at 200° C. for 10 hours. After the reaction system was naturally cooled down to ambient temperature, the product was taken out and separated, and then washed with anhydrous ethanol and water three times respectively. The resulting product was then redispersed into water. The analysis showed that the product was magnetite in morphology of sphericity, with a uniform particle diameter of 200 to 300 nm and a saturation magnetization of greater than 60 emu/g.

EXAMPLE 4

1.35 g of hydrated ferric chloride was dissolved in 40 ml of glycol at ambient temperature, and then 1.0 g of urea and 1.5 g of polyethylene glycol dissolved in the abovementioned solution and mixed uniformly. The mixed solution entirely transferred into a reaction autoclave with a capacity of 50 ml, sealed and then placed into a heating device at 200° C. for 16 hours. After the reaction system naturally cooled down to ambient temperature, the product taken out and separated, and then washed with anhydrous ethanol and water three times respectively. The resulting product then redispersed into water. The analysis showed that the product magnetite in morphology of sphericity, with a uniform particle diameter of 300 to 400 nm and a saturation magnetization of greater than 60 emu/g.

EXAMPLE 5

1.18 g of hydrated ferric chloride was dissolved in 40 ml of glycol at ambient temperature, and then 1.0 g of urea and 1.5 g of polyethylene glycol dissolved in the abovementioned solution and mixed uniformly. The mixed solution entirely transferred into a reaction autoclave with a capacity of 50 ml, sealed and then placed into a heating device at 200° C. for 48 hours. After the reaction system naturally cooled down to ambient temperature, the product taken out and separated, and then washed with anhydrous ethanol and water three times respectively. The resulting product then redispersed into water. The analysis showed that the product magnetite in morphology of sphericity, with a uniform particle diameter of 300 to 400 nm and a saturation magnetization of greater than 60 emu/g.

What is claimed is:

1. A process of preparing magnetite nanoparticles, characterized in that it includes the following steps:

1) preparing a ferric salt mixed system, wherein a soluble ferric salt is dissolved in glycol at ambient temperature, and then urea and polyethylene glycol are added and mixed uniformly to obtain the ferric salt mixed system, the mass ratio of glycol to the ferric salt being 15:1 to 60:1, glycol to urea being 20:1 to 100:1, and glycol to polyethylene glycol being 20:1 to 100:1;

2) reacting, wherein the ferric salt mixed system is transferred into a reaction autoclave, sealed and placed into a heating device to react at a temperature of 200 to 300° C. for 8 to 72 hours; and 3) washing, wherein after the reaction system is naturally cooled down to ambient temperature, the product is taken out, and washed with anhydrous ethanol and water in turn to obtain the magnetite nanoparticles.

2. The process of preparing magnetite nanoparticles according to claim 1, characterized in that the soluble ferric salt includes ferric chloride, ferric sulfate, ferric acetate and ferric nitrate.

3. The process of preparing magnetite nanoparticles according to claim 1, characterized in that polyethylene glycol has a molecular weight between 400 and 20,000.

4. The process of preparing magnetite nanoparticles according to claim 2, characterized in that polyethylene glycol has a molecular weight between 400 and 20,000.

* * * * *